(12) United States Patent
Roberge

(10) Patent No.: US 11,047,307 B2
(45) Date of Patent: Jun. 29, 2021

(54) HYBRID EXPANDER CYCLE WITH INTERCOOLING AND TURBO-GENERATOR

(71) Applicant: United Technologies Corporation, Farmington, CT (US)

(72) Inventor: Gary D. Roberge, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 139 days.

(21) Appl. No.: 16/131,706

(22) Filed: Sep. 14, 2018

(65) Prior Publication Data
US 2020/0088102 A1    Mar. 19, 2020

(51) Int. Cl.
*F02C 7/224* (2006.01)
*F02C 3/04* (2006.01)
*F02C 7/143* (2006.01)

(52) U.S. Cl.
CPC ............... *F02C 7/224* (2013.01); *F02C 3/04* (2013.01); *F02C 7/143* (2013.01); *F05D 2220/323* (2013.01); *F05D 2260/211* (2013.01)

(58) Field of Classification Search
CPC .... F02C 3/22; F02C 7/12; F02C 7/143; F02C 7/16; F02C 7/18; F02C 7/224; F02C 9/40; F05D 2260/211
See application file for complete search history.

(56) References Cited

U.S. PATENT DOCUMENTS

| | | | |
|---|---|---|---|
| 5,161,365 A | 11/1992 | Wright | |
| 9,057,327 B2 | 6/2015 | John et al. | |
| 9,903,232 B2 | 2/2018 | Amir et al. | |
| 9,932,124 B2 | 4/2018 | Kamath et al. | |
| 2007/0089423 A1 | 4/2007 | Norman et al. | |
| 2013/0160486 A1* | 6/2013 | Amir | F01K 25/10 62/611 |
| 2013/0186059 A1* | 7/2013 | Epstein | F02C 7/224 60/205 |
| 2013/0239542 A1 | 9/2013 | Dasgupta et al. | |
| 2016/0105078 A1* | 4/2016 | Santini | F16H 47/02 290/52 |
| 2016/0123226 A1 | 5/2016 | Razak et al. | |
| 2020/0088098 A1* | 3/2020 | Roberge | F02C 7/16 |

FOREIGN PATENT DOCUMENTS

| | | |
|---|---|---|
| EP | 0638715 A1 | 7/1994 |
| GB | 2531775 A | 5/2016 |
| WO | WO2012/045034 A2 | 4/2012 |

OTHER PUBLICATIONS

Extended European Search Report for EP Application No. 19197586.1, dated Jan. 29, 2020, 6 pages.

* cited by examiner

*Primary Examiner* — Scott J Walthour
(74) *Attorney, Agent, or Firm* — Kinney & Lange, P.A.

(57) ABSTRACT

A gas turbine engine system includes a gas turbine engine and a fuel turbine system. The gas turbine engine includes a heat exchange system configured to transfer thermal energy from a first compressed air flow and an exhaust gas flow to a fuel to produce a gaseous fuel. The fuel turbine system includes a fuel turbine fluidly coupled to the heat exchange system and a combustor of the gas turbine engine, and a fuel pump fluidly coupled to the heat exchange system and configured to be driven by the fuel turbine. The fuel turbine is configured to extract energy from expansion of the gaseous fuel to produce the gaseous fuel at a lower pressure for delivery to the combustor.

19 Claims, 3 Drawing Sheets

HYBRID EXPANDER CYCLE WITH INTERCOOLING AND TURBO-GENERATOR

BACKGROUND

The present disclosure relates generally to a gas turbine engine of an aircraft and, more specifically to a gas turbine engine using non-traditional cooled liquid fuel with intercooling and a turbo-generator.

Aircraft engines are being simultaneously challenged to provide increases in thermal efficiency, electrical power generation, and thermal management while reducing environmental emissions. Shaft power extraction impacts sizing of turbomachinery components and can have an adverse impact on performance and operability. Thermal management (e.g, providing a heat sink for engine and external systems) is limited by engine internal temperatures and can result in excessive pressure losses as heat is rejected using heat exchangers or other devices. Thermal efficiency improvement trends typically involve providing a higher overall pressure ratio (OPR) of the compressor with associated increases in compressor discharge pressure (P3) and accompanying temperature (T3). Current aircraft designs are generally limited by operational temperature limits of materials used for gas turbine engine structures. Additionally, as OPR is maximized, the relationship between T2, OPR, and T3 may result in the formation of harmful emissions including nitrogen oxides ($NO_x$) produced in the compression cycle of the engine with production compounded in subsequent combustion and turbine operations. While emission reductions in NOx, as well as carbon monoxide and particulates is desirable, it often runs counter to desired cycle characteristics and can be difficult to achieve with current hydrocarbon fuels. New engine concepts that could fundamentally alter the impact of these trends are desired.

SUMMARY

In one aspect, a gas turbine engine system includes a gas turbine engine and a fuel turbine system. The gas turbine engine includes a low pressure compressor (LPC), high pressure compressor (HPC), combustor, turbine, and heat exchange system. The LPC is configured to compress an inlet air flow to produce a first compressed air flow. The HPC is fluidly coupled to the low pressure compressor and configured to compress the first compressed air flow to produce a second compressed air flow. The combustor is fluidly connected to an outlet of the high pressure compressor and configured to combust a mixture of the second compressed air flow and a gaseous fuel at a first pressure to produce a combustion gas flow. The turbine is fluidly coupled to the combustor and configured to extract energy from expansion of the combustion gas flow to produce an exhaust gas flow. The heat exchange system is configured to transfer thermal energy from the first compressed air flow and the exhaust gas flow to a fuel to produce the gaseous fuel at a second pressure greater than the first pressure. The fuel turbine system includes a fuel turbine fluidly coupled to the heat exchange system and the combustor and a fuel pump fluidly coupled to the heat exchange system. The fuel pump is configured to be driven by the fuel turbine. The fuel turbine is configured to extract energy from expansion of the gaseous fuel at the second pressure to produce the gaseous fuel at the first pressure.

In another aspect, a method of operating a gas turbine engine system includes compressing an inlet air flow to produce a first compressed air flow, which is cooled via an intercooler heat exchange system to produce a cooled compressed air flow. The cooling process comprises transferring thermal energy to a liquid fuel. The cooled compressed air flow is then compressed to produce a second compressed air flow. Energy is extracted from expansion of a gaseous fuel through a fuel turbine fluidly connected to the intercooler heat exchange system. Expansion through the fuel turbine produces a gaseous fuel having a pressure greater than a pressure of the second compressed air flow. A mixture of the second compressed air flow and the gaseous fuel from an outlet of the fuel turbine is combusted in a combustor of the gas turbine engine. The liquid fuel used to cool the first compressed air flow is pumped to the intercooler heat exchange system via a pump driven by the fuel turbine.

In yet another aspect, a fuel turbine system includes a heat exchange system configured to transfer heat to a liquid fuel to produce a gaseous fuel, a fuel turbine in fluid communication with the heat exchange system and configured to extract energy from expansion of the gaseous fuel, and a fuel pump in fluid communication with the heat exchange system and configured to deliver the liquid fuel to the heat exchange system. The fuel pump is mechanically coupled to the fuel turbine and configured to be driven by the fuel turbine.

The present summary is provided only by way of example, and not limitation. Other aspects of the present disclosure will be appreciated in view of the entirety of the present disclosure, including the entire text, claims, and accompanying figures.

Figure 1:
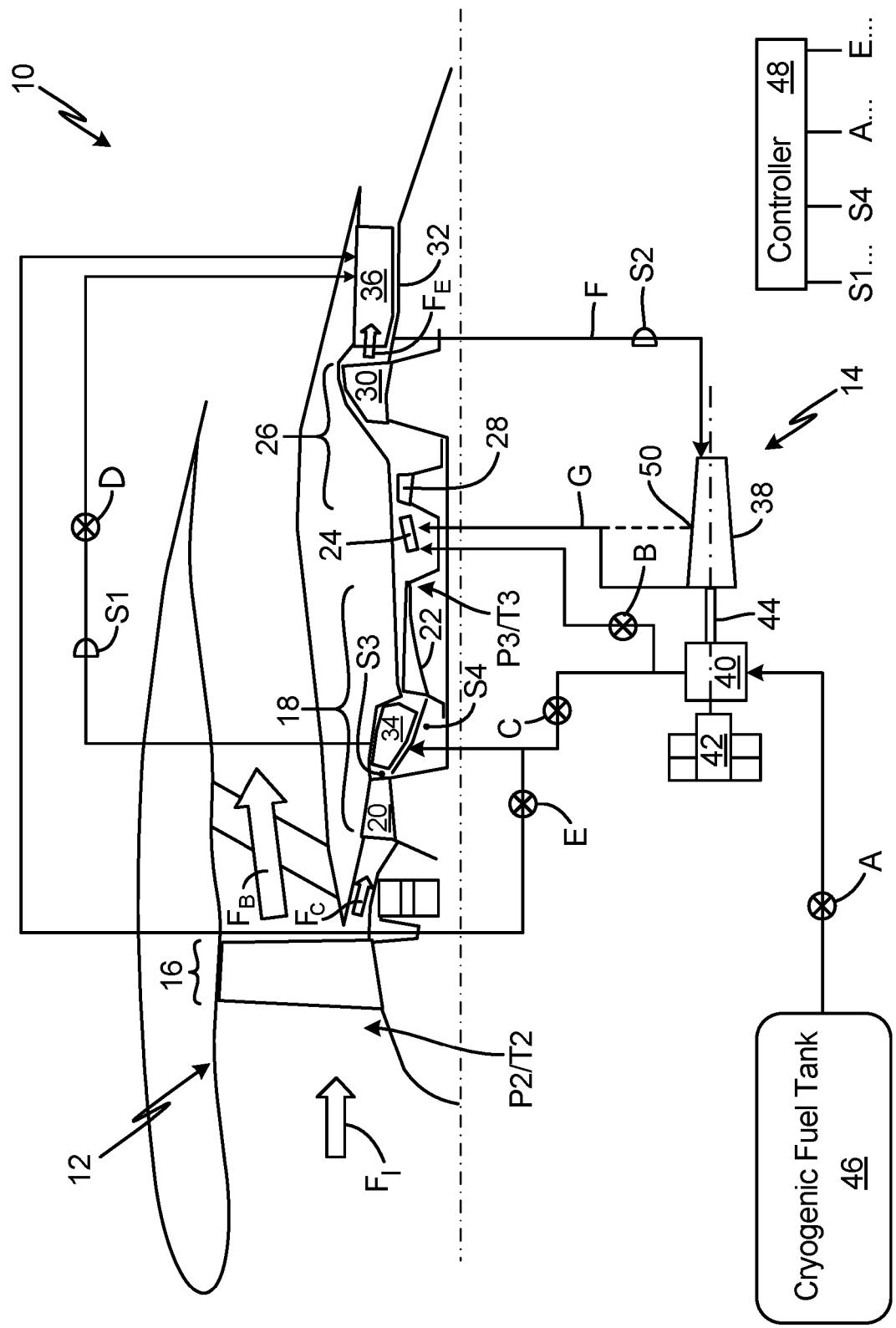
FIG. 1 is a schematic diagram of one embodiment of a gas turbine engine system with intercooling and a turbo-generator with an expander cycle.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure combines the use of a non-traditional fuel, such as methane or hydrogen, stored in a cooled liquid state, to drive a hybrid cycle of a gas turbine engine system—the hybrid cycle consisting of a conventional Brayton cycle with compressor intercooling, and an expander cycle, which utilizes waste heat to drive a turbo-generator. In the cooled liquid state, the fuel provides a heat sink for vehicle heat loads and compressor intercooling. Compressor intercooling reduces a temperature T3 of air exiting the compressor for a given value of OPR and P3, which makes increased pressure ratio cycles achievable with current materials. Fuel is further heated through a regenerative heat exchange system to add thermal energy and boost fuel pressure. The resultant high-pressure gaseous fuel is then expanded through a multi-stage fuel turbine, which can drive fuel pumps, electrical power generators, and other external systems. Fuel expanded through the multi-stage fuel turbine is then used in the gas turbine engine for combustion.

The disclosed system can use plentiful and cleaner burning fuel types as compared to current hydrocarbon fuels to allow engine cycle and OPR/thermal efficiency gains to be established using existing materials. With the disclosed system, OPR can increase from approximately 55 using a conventional design to more than 80 while staying below a T3 limit. Additionally, electrical generation using regenerative (i.e., waste heat) input can be provided with reduced impact on turbomachinery sizing, performance, and operability. Additional benefits may also be realized with new combustor concepts enabled by the disclosed system, including reduced combustion length, staged combustion, and reduced emissions.

FIG. 1 is a schematic diagram of one embodiment of gas turbine engine system 10 with intercooling and expander cycle. System 10 includes gas turbine engine 12 and turbo-generator 14. Gas turbine engine 12 includes fan section 16, compressor section 18 (including low pressure compressor (LPC) 20 and high pressure compressor (HPC) 22), combustor section 24, turbine section 26 (including high pressure turbine (HPT) 28 and low pressure turbine (LPT) 30), exhaust case 32, intercooler 34, and exhaust heat exchanger 36. Fan section 16 draws inlet air flow $F_1$, which splits into bypass air flow $F_B$ directed through a bypass duct, and core air flow $F_C$ directed to the engine core. LPC 20 draws air in along the core flow path where air is compressed and communicated to intercooler 34, which cools the compressed air before delivery to HPC 22. The cooled air is further compressed in HPC 22 and communicated to combustor section 24. In combustor section 24, the compressed air is mixed with fuel and ignited to generate a high-pressure combustion exhaust gas stream that expands through turbine section 26 where energy is extracted and utilized to drive fan section 16 and compressor section 18.

Although the disclosed non-limiting embodiment depicts a turbofan gas turbine engine, it should be understood that the concepts described herein are not limited to use with turbofans as the teachings may be applied to other types of turbine engines, including, for example, a turbine engine including a three-spool architecture. While the present disclosure focuses on utilization of a twin spool, axial flow gas turbine engine, it will be appreciated that it has utility in other types of engines.

Turbo-generator 14 includes fuel turbine 38, fuel pump 40, and motor/generator 42. Fuel turbine 38 is a multi-stage turbine with multiple stages of turbine blades driven by the expansion of high-pressure gaseous fuel. Fuel turbine 38, fuel pump 40, and motor/generator 42 are coupled to rotor shaft 44 such that fuel pump 40 and motor/generator 42 are mechanically driven by the rotation of fuel turbine 38. Fuel pump 40 is configured to deliver fuel through system 10. Motor/generator 42 can be configured to supply power for system 10 components and/or other engine systems and power needs.

System 10 additionally includes fuel tank 46 configured to contain a cryogenic fuel and a series of conduits (e.g., fuel lines A-J) configured to deliver the fuel in liquid and/or gaseous phase via fuel pump 40 through system 10. A plurality of valved fuel lines A-E can be used to control the flow of fuel through system 10 via controller 48. Controller 48 can be operatively coupled (e.g., electrically and/or communicatively) to components shown in FIG. 1 as well as components not depicted (e.g., additional valves, sensors, etc.) to control operation of system 10. Controller 48 can be configured to receive, transmit, and/or process sensor data and/or signals for the operation of system 10. Controller 48 can include a processor, such as a microprocessor, programmable logic controller, or the like.

Additionally, system 10 can include a plurality of temperature and/or pressure sensors S1-S3 configured to detect a temperature and/or pressure of the fuel at various locations in system 10 or air flow through gas turbine engine 12. As shown in FIG. 1, sensors S1 and S2 detect a temperature and/or pressure of fuel in fuel lines D and F, while sensor S3 detects a temperature and/or pressure of air entering intercooler 34. In some embodiments, sensor S4 can be used to detect leakage of fuel from intercooler 34. In some embodiments, system 10 can also include an auxiliary fuel tank (not shown), configured to deliver an auxiliary supply of gaseous fuel to combustor 24.

System 10 can be used to improve thermal efficiency of gas turbine engine 12 by reducing compressor discharge temperature T3, while increasing the OPR of the compression system. The OPR is increased by increasing the compressor outlet pressure P3. As pressure increases across compressor section 18, temperature also increases. Current aircraft designs are generally limited by material capability and compressor outlet temperature T3 limits. System 10 allows OPR/thermal efficiency gains to be established while keeping compressor discharge temperature T3 below a temperature limit for currently available materials.

In addition to improving thermal efficiency of gas turbine engine 12, system 10 can be configured to reduce emissions as compared to engines that burn traditionally used fossil fuels. Additionally, system 10 can be used to generate power for operating components of system 10, including fuel pump 40 as well as other engine systems, from heat recovered from an exhaust gas flow $F_E$ from gas turbine engine 12.

As illustrated in FIG. 1, a cryogenic liquid fuel is stored in fuel tank 46 at low temperature and pressure. Suitable fuels can include, but are not limited to, liquefied natural gas (LNG) and liquid hydrogen. Tank 46 can be configured in any manner and made of any material suitable for storing cryogenic fuels as known in the art. The temperature of the fuel is sufficiently low to provide intercooling between LPC 20 and HPC 22, but can vary significantly depending on system 10 configuration, intercooling configuration, and inlet air temperature T2. In one non-limiting example, liquid hydrogen supplied to intercooler 34 at a temperature of −350° F. or lower can effectively remove heat from the compressed air exiting LPC 20.

Fuel pump 40 is configured to pump liquid fuel from tank 46 through fuel lines A and C to intercooler 34. Fuel pump 40 increases the pressure of liquid fuel entering intercooler 34. In some non-limiting embodiments, the pressure of fuel entering intercooler 34 from fuel pump 40 can be in excess of 550 psi (3,792 kPa). It will be understood by one of ordinary skill in the art to design fuel pump 40 and the fuel circuit of system 10 (i.e., fuel lines A-F) to provide effective circulation of the fuel through system 10. A flow of liquid fuel pumped to intercooler 34 can be regulated via valved fuel line C to provide cooling as necessary to achieve a desired OPR.

Intercooler is configured to place compressed air exiting LPC 20 and liquid fuel in thermal communication such that thermal energy from the compressed air is transferred to the liquid fuel. Intercooler 34 can be a plate-fin, shell-and-tube, or other suitable air-to-liquid heat exchanger as known in the art. As illustrated in FIG. 1, intercooler 34 can be positioned to substantially cover an air flow path between LPC 20 and HPC 22. In some embodiments, intercooler 34 can have a web-like or grid-like configuration with a network of cooling channels extending radially, crosswise, and/or in concentric rings over the primary inlet to provide cooling to a substantial portion of air exiting LPC 20. In other embodiments, intercooler 34 can be positioned to substantially surround the flow path between LPC 20 and HPC 22, as illustrated in and further disclosed with respect to FIG. 2. In other embodiments intercooler 34 can be used to cool air extracted prior to exiting LPC 20 or after entering HPC 22 using mid-stage bleeds and manifolds to extract, cool, and reintroduce pressurized air through compressor section 18. The temperature of fuel exiting intercooler 34 can vary depending on the temperature of the fuel and the compressed air entering intercooler 34 and the performance of intercooler 34, including heat transfer characteristics, size, and fluid residence time. Depending on inlet fuel temperature and operating conditions, the fuel may remain in a liquid state or may vaporize when heated by the compressed air in intercooler 34.

Fuel exiting intercooler 34 is pumped through fuel line D to exhaust heat exchanger 36 where heat from exhaust gas exiting gas turbine engine 12 can be transferred to the fuel to produce a high-pressure gaseous fuel capable of driving fuel turbine 28. Exhaust heat exchanger 36 can be a plate-fin, shell-and-tube, or other suitable air-to-liquid heat exchanger as known in the art. As illustrated in FIG. 1, exhaust heat exchanger 36 can be located in a flow path of the exhaust gas $F_E$. In other embodiments, exhaust heat exchanger 36 can be disposed in an exhaust case wall of gas turbine engine 12 and heat can be transferred through a wall to fuel circulating in tubing coiled or otherwise distributed around the exhaust case, as illustrated in and further disclosed with respect to FIG. 2. Exhaust heat exchanger 36 is configured to heat fuel from intercooler 34 with waste heat from the exhaust gas of gas turbine engine 12. In a non-limiting example, fuel exiting exhaust heat exchanger 36 and entering fuel turbine 38 can have a temperature of about 1300° F. (704° C.) and pressure of about 515 psi (3,551 kPa).

The high-pressure gaseous fuel directed to turbo-generator 14 through fuel line F expands through multi-stage fuel turbine 38, driving rotation of fuel turbine 38 and thereby fuel pump 40 and motor/generator 42, which can be located on common shaft 44 or otherwise mechanically coupled. Gaseous fuel exiting fuel turbine 38 can be supplied to combustor 24 through fuel line G. Fuel turbine 38 is configured to maximize turbine work extraction, while providing a fuel pressure sufficient to overcome an operating pressure P3. As such, the pressure of gaseous fuel exiting fuel turbine 38 must be greater than the pressure P3 of compressed air entering combustor 24. Fuel turbine 38 can be sized to deliver the gaseous fuel at a pressure greater than P3. In some embodiments, fuel turbine 38 can include an interstage discharge outlet 50 to enable discharge of fuel at a higher pressure than complete turbine discharge would provide as one element of a control mechanism to ensure the pressure of fuel delivered to combustor 24 exceeds P3. Controller 48 can be used to regulate the amount of fuel delivered to combustor 24 to maintain optimum operation.

Fuel turbine 38 drives fuel pump 40 and motor/generator 42, which are mechanically coupled to fuel turbine shaft 44. Fuel pump 40 produces a continuous cycling of fuel through system 10. Motor/generator 42 can be used to provide power to engine systems and components, including components of system 10. In some embodiments, motor/generator 42 can be used to drive fuel pump 40 when fuel turbine 38 is not in operation (e.g., at engine startup). In some embodiments, power extracted or input from motor generator 42 can be varied as one element of a control architecture used to ensure fuel discharge pressure from fuel turbine 38 is adequate to overcome P3. In some embodiments, pressurized liquid phase fuel discharged from fuel pump 40 may be supplied directly to combustor 24 at engine start using a separate valve and fuel line (not shown). Fuel injection components within combustor 24 can be designed to operate with liquid or gaseous fuel. As the engine operates and available fuel heating sources increase, a portion of fuel flow can be gradually increased through line C described above and eventually transitioned such that no liquid phase fuel is supplied to combustor 24.

Fuel can be routed through varying fuel lines depending on the mode of operation (e.g., startup and cruise) and operating conditions. During engine startup, liquid fuel may be supplied directly to combustor 24 through fuel line B. In this instance, fuel pump 40 can be driven by motor/generator 42 or an alternative power source (not shown). Fuel line E can be provided as a safety mechanism in the event of fuel leakage from intercooler 34. Sensor S4 can be used to detect leakage of fuel from intercooler 34 and signal controller 48 to close valved fuel line C and open bypass fuel line E to redirect fuel to exhaust heat exchanger 36. Exhaust heat exchanger 36 transfers waste heat from exhaust gas to the fuel to vaporize fuel as necessary to drive turbo-generator 14. From exhaust heat exchanger 36, the gaseous fuel is delivered to fuel turbine 38 via fuel line F.

Figure 2:
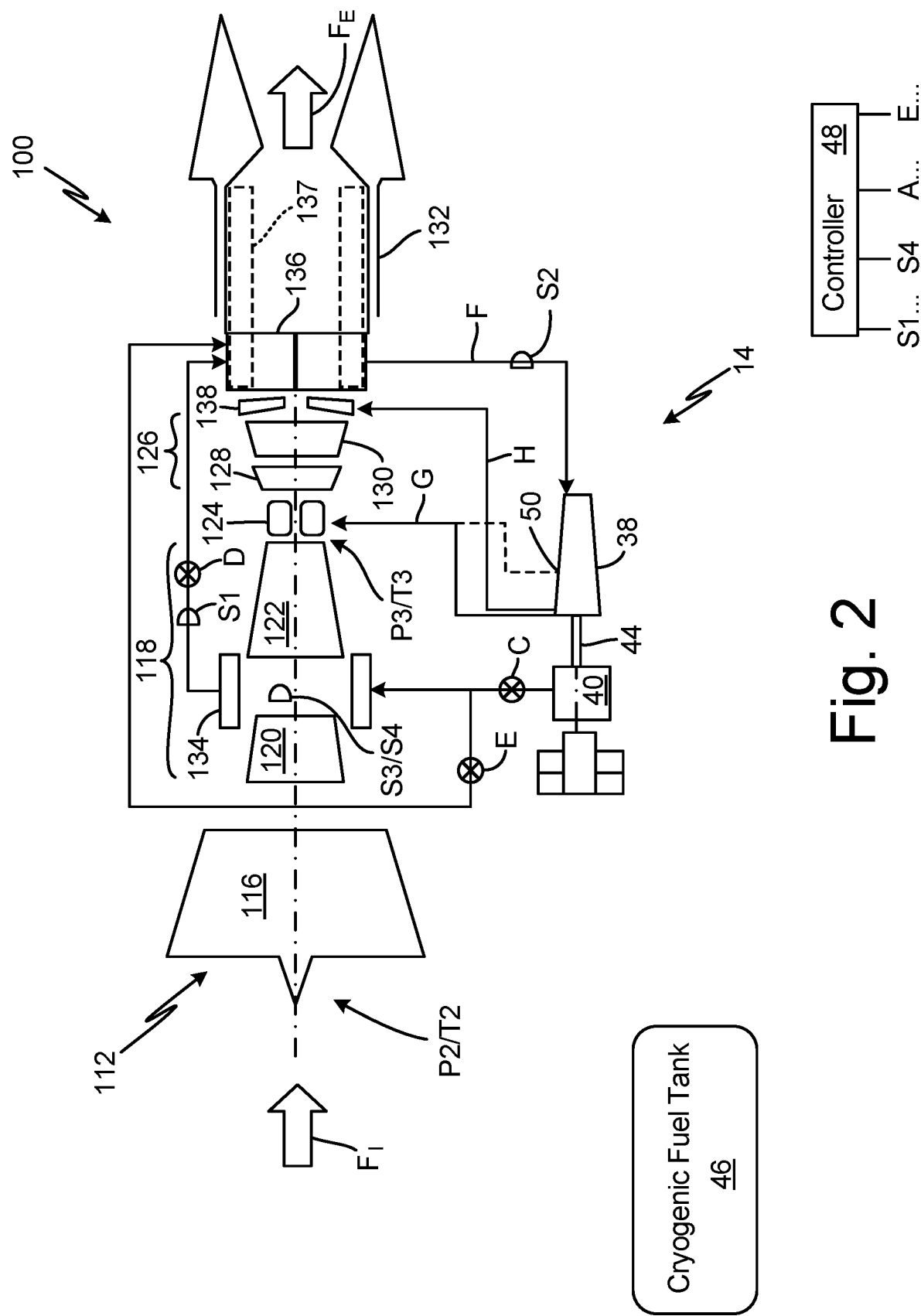
FIG. 2 is a schematic diagram of another embodiment a gas turbine engine system with intercooling and a turbo-generator with an expander cycle.

FIG. 2 is a schematic diagram of gas turbine engine system 100 with intercooling and expander cycle. System 100 includes a military-style gas turbine engine 112 with a low bypass ratio and turbo-generator 14, as illustrated in and described with respect to FIG. 1, system 10. Gas turbine engine 112 includes fan section 116, compressor section 118 (including low pressure compressor (LPC) 120 and high pressure compressor (HPC) 122), combustor section 124, turbine section 126 (including high pressure turbine (HPT) 128 and low pressure turbine (LPT) 130), exhaust case 132, intercooler 134, and exhaust heat exchanger 136/137. In some embodiments, gas turbine engine 112 can also include augmentor 138. LPC 120 draws air in along core flow path where air is compressed and communicated to intercooler 134, which cools the compressed air before delivery to HPC 122. The cooled air is further compressed in HPC 122 and communicated to combustor section 124. In combustor section 124, the compressed air is mixed with fuel and ignited to generate a high-pressure combustion exhaust gas stream that expands through turbine section 126 where energy is extracted and utilized to drive fan section 116 and compressor section 118. Augmentor 138 can add additional thrust to the engine by burning fuel and increasing the temperature and associated momentum of the exhaust flow in a secondary combustor section.

System 100 additionally includes fuel tank 46 configured to contain a cryogenic fuel and a series of conduits (fuel lines A-H) configured to deliver the fuel in liquid and/or gaseous phase via fuel pump 40 through system 100. As described with respect to system 10, controller 48 can be operatively coupled (e.g., electrically and/or communicatively) to components shown in FIG. 2 as well as components not depicted (e.g., additional valves, sensors, etc.) to control operation of system 100. Additionally, system 100 can include a plurality of temperature and/or pressure sensors S1-S3 configured to detect a temperature and/or pressure of the fuel at various locations in system 100 or air flow through gas turbine engine 112. Sensor S4 can be included in some embodiments to detect leakage of fuel from intercooler 134. In some embodiments, system 100 can also include an auxiliary fuel tank (not shown), configured to deliver an auxiliary supply of gaseous fuel to combustor 124.

The operation of system 100 does not substantially differ from the operation of system 10 with cryogenic liquid fuel being used to cool compressed air entering HPC 122 and recover heat from exhaust gas to produce a high-pressure gaseous fuel used to drive turbo-generator 14 and provide fuel for combustion in combustor 124 and augmentor 138. Cryogenic liquid fuel is delivered to intercooler 134 from fuel tank 46 via pump 40. Intercooler is configured to place compressed air exiting LPC 120 and liquid fuel in thermal communication such that thermal energy from the compressed air is transferred to the liquid fuel. Fuel exiting intercooler 134 is pumped through fuel line D to exhaust heat exchanger 136 where heat from exhaust gas exiting gas turbine engine 112 can be transferred to the fuel to produce a high-pressure gaseous fuel capable of driving fuel turbine 28. The high-pressure gaseous fuel directed to turbo-generator 14 through fuel line F expands through multi-stage fuel turbine 38, driving rotation of fuel turbine 38 and thereby fuel pump 40 and motor/generator 42, which can be located on common shaft 44 or otherwise mechanically coupled. Gaseous fuel exiting fuel turbine 38 can be supplied to combustor 124 through fuel line G. Additionally, the gaseous fuel can be and supplied to augmentor 138 through fuel line H. Fuel turbine 38 is configured to maximize turbine work extraction, while providing a fuel pressure sufficient to overcome an operating pressure P3 for delivery to combustor 124. As such, the pressure of gaseous fuel exiting fuel turbine 38 must be greater than the pressure P3 of compressed air entering combustor 124. In some embodiments, gaseous fuel can be extracted from an interstage outlet 50 to ensure pressure adequate to overcome P3 for delivery to combustor 124. The fuel pressure required for augmentor 138 is much lower than P3 and, therefore, may be extracted from a final outlet of fuel turbine 38 (i.e., after a final turbine stage). For example, an augmentor fuel pressure requirement may only be 20% of P3. Combustor 124 and augmentor 138 include suitable fuel injectors for delivering gaseous fuel. Controller 48 can be used to regulate the amount of fuel delivered to combustor 124 and augmentor 138 to maintain optimum operation.

As illustrated in FIG. 2, intercooler 134 can be positioned to substantially surround the flow path between LPC 120 and HPC 122. In this embodiment, compressed air exiting LPC 120 can be collected in one or more exit manifolds and ducted to an externally disposed intercooler 134 (e.g., radially outward from the flowpath shown). Air that passes through the intercooler can be collected using one or more inlet manifolds and communicated with an inlet to HPC 122. The location of intercooler 134 outside of flowpath (radially outward) provides a potential for increased heat exchanger volume and relaxed cross sectional area constraints thereby allowing for effective heat transfer and cooling of compressed air with reduced associated pressure losses for the compressed air being cooled. Alternatively, intercooler 134 can positioned to substantially cover the air flow path between LPC 120 and HPC 122 as disclosed with respect to system 10. Intercooler 134 can be a plate-fin, shell-and-tube, or other suitable air-to-liquid heat exchanger as known in the art. The temperature of fuel exiting intercooler 134 can vary depending on the temperature of the fuel and compressed air entering intercooler 134. Depending on the conditions, the fuel may remain in a liquid state or may vaporize when heated by the compressed air.

Exhaust heat exchanger 136 can be a plate-fin, shell-and-tube, or other suitable air-to-liquid heat exchanger as known in the art. As illustrated in FIG. 2, exhaust heat exchanger 136 can be located in a flow path of the exhaust gas $F_E$ or disposed in an exhaust case wall of gas turbine engine 12 with heat being transferred through a wall to fuel circulating in tubing coiled or otherwise distributed around the exhaust case (137, shown in phantom). Exhaust heat exchanger 136/137 is configured to heat fuel from intercooler 134 with waste heat from the exhaust gas of gas turbine engine 12. In a non-limiting example, fuel exiting exhaust heat exchanger 136/137 and entering fuel turbine 38 can have a temperature of about 1300° F. (704° C.) and pressure of about 515 psi (3,551 kPa).

Figure 3:
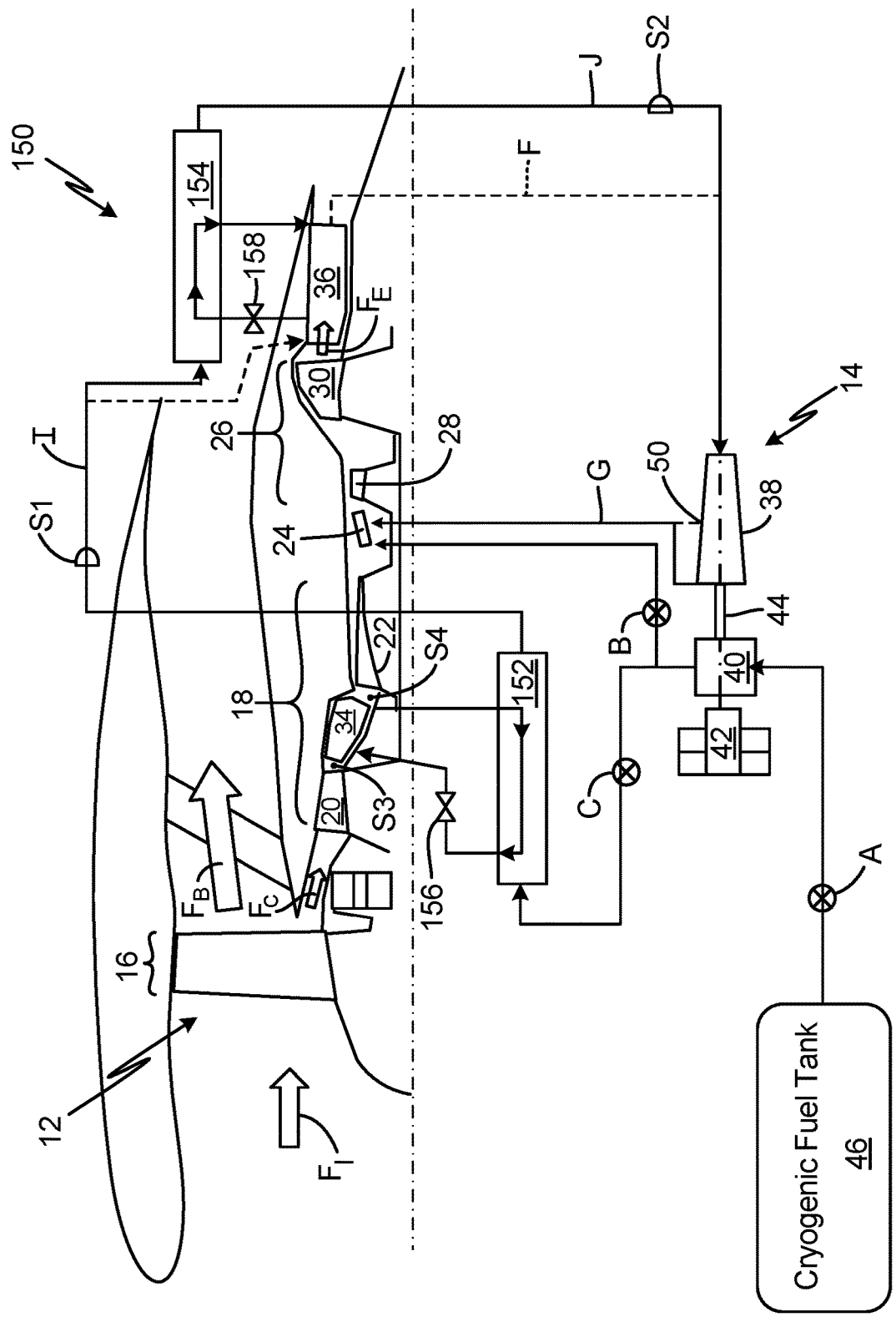
FIG. 3 is yet another embodiment of a gas turbine engine system with intercooling and a turbo-generator with an expander cycle.

In alternative embodiments, an intermediate heat exchanger can be utilized in systems 10 and 100 to avoid bypassing intercooler 34, 134 in the event of fuel leakage. FIG. 3 is a schematic diagram of gas turbine engine system 150 with intermediate intercooler heat exchanger 152 and optional intermediate exhaust heat exchanger 154. Although system 150 depicts use of intermediate heat exchangers 152, 154 with gas turbine engine 12 and system 10, it will be appreciated that intermediate heat exchangers 152, 154 can be incorporated in substantially the same manner in system 100. Intermediate intercooler heat exchanger 152 can be located external to gas turbine engine 12 or outside of a core air flow to prevent fuel leakage into the core of gas turbine engine 12. As illustrated in FIG. 3, fuel can be used to cool a separate inert (non-combustible) working fluid, such as helium or carbon dioxide that can circulate through intercooler 34. Intermediate intercooler heat exchanger 152 is configured to receive liquid fuel from fuel pump 40 and place the liquid fuel and the working fluid in thermal communication. Intercooler 34 is configured to receive the working fluid from intermediate intercooler heat exchanger 152 and place the working fluid in thermal communication with the compressed air flow exiting LPC 20, such that thermal energy is transferred indirectly from the compressed air to the liquid fuel. As illustrated in FIG. 3, working fluid is circulated between intermediate intercooler heat exchanger 152 and intercooler 34 via pump 156. Liquid fuel is pumped from tank 46 via fuel pump 40 to intermediate intercooler heat exchanger 152, where the fuel serves as a heat sink for working fluid from intercooler 34. From intermediate intercooler heat exchanger 152, fuel is circulated through exhaust heat exchanger 36 or, alternatively, intermediate exhaust heat exchanger 154, and is expanded through fuel turbine 38 before being delivered to combustor 24 for combustion in gas turbine engine 12.

With the exception of routing liquid fuel through intercooler 34, system 150 can operate in a manner consistent with systems 10, 100. As previously disclosed and illustrated in FIGS. 1 and 2, fuel can be routed through various fuel lines depending on operational mode and operating conditions. It will be understood that the various fuel paths disclosed with respect to systems 10, 100 and illustrated in FIGS. 1 and 2 also apply to system 150 as illustrated in FIG. 3. With the addition of intermediate intercooler heat exchanger 152, liquid fuel in system 150 bypasses intercooler 34 through fuel line I, which fluidly connects intermediate intercooler heat exchanger 152 with exhaust heat exchanger 36 (shown in phantom) or, alternatively, intermediate exhaust heat exchanger 154.

In some embodiments, both intermediate intercooler heat exchanger 152 and intermediate exhaust heat exchanger 154 can be used to separate the fuel from the engine core. As illustrated in FIG. 3, intermediate exhaust heat exchanger 154 is in fluid communication with intermediate intercooler heat exchanger 152 via fuel line I and exhaust heat exchanger 36. Intermediate exhaust heat exchanger 154 is configured to receive the liquid fuel from intermediate intercooler heat exchanger 152 and place the fuel in thermal communication with a separate working fluid. Exhaust heat exchanger 36 is configured to receive the working fluid from the intermediate exhaust heat exchanger 154 and place the working fluid in thermal communication with the exhaust gas $F_E$, such that thermal energy is transferred indirectly from the exhaust gas to the fuel. As illustrated in FIG. 3, working fluid is circulated between intermediate exhaust heat exchanger 154 and exhaust heat exchanger 36 via pump 158. Fuel is pumped from tank 46 through intermediate intercooler heat exchanger 152 and through intermediate exhaust heat exchanger 154. From intermediate exhaust heat exchanger 154, fuel is directed through fuel line J to turbo-generator 14 where fuel is directed through fuel turbine 38 and to combustor 24 for combustion in gas turbine engine 12.

The working fluid used in intermediate intercooler heat exchanger 152 is a non-flammable fluid capable of removing thermal energy from the compressed air exiting LPC 20 and transferring thermal energy to the liquid fuel. The working fluid used in intermediate exhaust heat exchanger 154 can also be a non-flammable fluid and is capable of removing thermal energy from exhaust gas and transferring thermal energy to the fuel. Working fluid for both intermediate intercooler and intermediate exhaust heat exchangers 152, 154 can include, for example, liquid helium or carbon dioxide, but is not limited to the fluids disclosed.

The disclosed systems 10, 100, 150 can use plentiful and cleaner burning fuel to achieve a higher OPR while allowing continued use of existing fan, compressor, and hot section materials, and generating energy using regenerative (i.e., waste heat) input with reduced impact on turbomachinery sizing, performance, and operability.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

DISCUSSION OF POSSIBLE EMBODIMENTS

The following are non-exclusive descriptions of possible embodiments of the present invention.

A gas turbine engine system includes a gas turbine engine and a fuel turbine system. The gas turbine engine includes a low pressure compressor (LPC), high pressure compressor (HPC), combustor, turbine, and heat exchange system. The LPC is configured to compress an inlet air flow to produce a first compressed air flow. The HPC is fluidly coupled to the low pressure compressor and configured to compress the first compressed air flow to produce a second compressed air flow. The combustor is fluidly connected to an outlet of the high pressure compressor and configured to combust a mixture of the second compressed air flow and a gaseous fuel at a first pressure to produce a combustion gas flow. The turbine is fluidly coupled to the combustor and configured to extract energy from expansion of the combustion gas flow to produce an exhaust gas flow. The heat exchange system is configured to transfer thermal energy from the first compressed air flow and the exhaust gas flow to a fuel to produce the gaseous fuel at a second pressure greater than the first pressure. The fuel turbine system includes a fuel turbine fluidly coupled to the heat exchange system and the combustor and a fuel pump fluidly coupled to the heat exchange system. The fuel pump is configured to be driven by the fuel turbine. The fuel turbine is configured to extract energy from expansion of the gaseous fuel at the second pressure to produce the gaseous fuel at the first pressure.

The gas turbine engine system of the preceding paragraph can optionally include, additionally and/or alternatively, any one or more of the following features, configurations, and/or additional components:

A further embodiment of the gas turbine engine system, wherein the heat exchange system can include an intercooler disposed in a flow path of the first compressed air flow between the low pressure compressor and the high pressure compressor and wherein the intercooler can be fluidly coupled to a component selected from the group consisting of the fuel pump and an intermediate intercooler heat exchanger.

A further embodiment of the gas turbine engine system of any of the preceding paragraphs, wherein the intercooler can be fluidly coupled to the fuel pump.

A further embodiment of the gas turbine engine system of any of the preceding paragraphs, wherein the intercooler can be fluidly coupled to the intermediate intercooler heat exchanger. The intermediate intercooler heat exchanger can be disposed external to the flow path of the first compressed air flow and fluidly coupled to the fuel pump and wherein the intermediate intercooler heat exchanger can be configured to place the fuel and a first working fluid in a thermal communication and wherein the intercooler is configured to receive the first working fluid from the intermediate intercooler heat exchanger and place the first working fluid in thermal communication with the first compressed air flow, such that thermal energy is transferred indirectly from the first compressed air flow to the fuel.

A further embodiment of the gas turbine engine system of any of the preceding paragraphs, wherein the heat exchange system can further include an exhaust heat exchange system configured to transfer thermal energy from the exhaust gas flow to the fuel, wherein the exhaust heat exchange system can be fluidly coupled to one of the heat exchangers selected from the group consisting of the intercooler and the intermediate intercooler heat exchanger.

A further embodiment of the gas turbine engine system of any of the preceding paragraphs, wherein the exhaust heat exchange system can include an exhaust heat exchanger fluidly coupled to the intercooler.

A further embodiment of the gas turbine engine system of any of the preceding paragraphs, wherein the exhaust heat exchange system can include an exhaust heat exchanger, and an intermediate exhaust heat exchanger fluidly coupled to the intermediate intercooler and the exhaust heat exchanger. The intermediate exhaust heat exchanger can be configured to place the fuel in thermal communication with a second working fluid, and wherein the exhaust heat exchanger can be configured to receive the second working fluid from the intermediate exhaust heat exchanger and place the second working fluid in thermal communication with the exhaust gas, such that thermal energy is transferred indirectly from the exhaust gas to the fuel.

A further embodiment of the gas turbine engine system of any of the preceding paragraphs, wherein the fuel turbine can include multiple stages and is configured to produce the gaseous fuel at the second pressure, wherein the second pressure is greater than a pressure of the second compressed air flow.

A further embodiment of the gas turbine engine system of any of the preceding paragraphs, wherein the fuel turbine system can further include a combination motor/generator configured to be driven by the fuel turbine.

A further embodiment of the gas turbine engine system of any of the preceding paragraphs, wherein the fuel pump and combination motor/generator can be mechanically coupled to a rotor shaft of the fuel turbine.

A further embodiment of the gas turbine engine system of any of the preceding paragraphs, wherein the fuel pump can be in fluid communication with a cryogenic fuel.

A method of operating a gas turbine engine system includes compressing an inlet air flow to produce a first compressed air flow, which is cooled via an intercooler heat exchange system to produce a cooled compressed air flow. The cooling process comprises transferring thermal energy to a liquid fuel. The cooled compressed air flow is then compressed to produce a second compressed air flow. Energy is extracted from expansion of a gaseous fuel through a fuel turbine fluidly connected to the intercooler heat exchange system. Expansion through the fuel turbine produces a gaseous fuel having a pressure greater than a pressure of the second compressed air flow. A mixture of the second compressed air flow and the gaseous fuel from an outlet of the fuel turbine is combusted in a combustor of the gas turbine engine. The liquid fuel used to cool the first compressed air flow is pumped to the intercooler heat exchange system via a pump driven by the fuel turbine.

The method of the preceding paragraph can optionally include, additionally and/or alternatively, any one or more of the following features, configurations, additional components, and/or steps:

A further embodiment of the method, wherein the gaseous fuel can be produced by transferring thermal energy to the liquid fuel via the intercooler heat exchange system to produce a heated fuel and transferring thermal energy to the heated fuel via an exhaust heat exchanger system.

A further embodiment of the method of any of the preceding paragraphs, wherein transferring thermal energy via the exhaust heat exchange system can include transferring thermal energy from an exhaust gas of the gas turbine engine to the heated fuel received from the intercooler heat exchange system.

A further embodiment of the method of any of the preceding paragraphs can further include pumping the liquid fuel through an intercooler of the intercooler heat exchange system, wherein the intercooler can be disposed in a flow path of the first compressed air flow.

A further embodiment of the method of any of the preceding paragraphs, pumping the liquid fuel through an intermediate intercooler heat exchanger, pumping a first working fluid through the intercooler and the intermediate intercooler heat exchanger, transferring thermal energy from the first compressed air flow to the first working fluid, and transferring thermal energy from the first working fluid to the liquid fuel to produce the heated fuel.

A further embodiment of the method of any of the preceding paragraphs can include pumping the heated fuel received from the intermediate intercooler heat exchanger through an intermediate exhaust heat exchanger, pumping a second working fluid through the exhaust heat exchanger and the intermediate exhaust heat exchanger, transferring thermal energy from the exhaust gas to the second working fluid, and transferring thermal energy from the second working fluid to the fuel received from the intermediate intercooler heat exchanger.

A further embodiment of the method of any of the preceding paragraphs, wherein the liquid fuel can be cryogenic.

A further embodiment of the method of any of the preceding paragraphs can further include extracting power from the fuel turbine via a combined motor/generator.

A fuel turbine system includes a heat exchange system configured to transfer heat to a liquid fuel to produce a gaseous fuel, a fuel turbine in fluid communication with the heat exchange system and configured to extract energy from expansion of the gaseous fuel, and a fuel pump in fluid communication with the heat exchange system and configured to deliver the liquid fuel to the heat exchange system. The fuel pump is mechanically coupled to the fuel turbine and configured to be driven by the fuel turbine.

The fuel turbine system of the preceding paragraph can optionally include, additionally and/or alternatively, any one or more of the following features, configurations, and/or additional components:

A further embodiment of the fuel turbine system, wherein the heat exchange system can include an intercooler of a compressor section of a gas turbine engine with the intercooler heat exchange system configured to cool a compressed air flow, and wherein the fuel turbine can be fluidly connected to a combustor of the gas turbine engine and configured to deliver the gaseous fuel to the combustor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine system comprising:
   a gas turbine engine comprising:
     a compressor section comprising:
       a low pressure compressor configured to compress an inlet air flow to produce a first compressed air flow;
       a high pressure compressor fluidly coupled to the low pressure compressor and configured to compress the first compressed air flow to produce a second compressed air flow;
a combustor fluidly connected to an outlet of the high pressure compressor and configured to combust a mixture of the second compressed air flow and a gaseous fuel, the gaseous fuel being at a first pressure, to produce a combustion gas flow;
a turbine fluidly coupled to the combustor and configured to extract energy from expansion of the combustion gas flow to produce an exhaust gas flow; and
a heat exchange system configured to transfer thermal energy from the first compressed air flow and the exhaust gas flow to a fuel to produce the gaseous fuel at a second pressure greater than the first pressure; and
a fuel turbine system comprising:
a multi-stage fuel turbine fluidly coupled to the heat exchange system and the combustor and configured to extract energy from expansion of the gaseous fuel at the second pressure, wherein the multi-stage fuel turbine comprises an interstage discharge outlet configured to extract fuel, before a final turbine stage of the multi-stage fuel turbine, at a higher pressure than a fuel pressure at a final outlet of the multi-stage fuel turbine, wherein the fuel turbine system is configured to mix fuel from the interstage discharge outlet and the final outlet to produce the gaseous fuel at the first pressure and supply the gaseous fuel at the first pressure to the combustor; and
a fuel pump fluidly coupled to the heat exchange system and configured to be driven by the multi-stage fuel turbine.

2. The gas turbine engine system of claim 1, wherein the heat exchange system comprises an intercooler disposed in a flow path of the first compressed air flow between the low pressure compressor and the high pressure compressor and wherein the intercooler is fluidly coupled to a component selected from the group consisting of the fuel pump and an intermediate intercooler heat exchanger.

3. The gas turbine engine system of claim 2, wherein the intercooler is fluidly coupled to the fuel pump.

4. The gas turbine engine system of claim 2, wherein the intercooler is fluidly coupled to the intermediate intercooler heat exchanger, wherein the intermediate intercooler heat exchanger is disposed external to the compressor section and fluidly coupled to the fuel pump and wherein the intermediate intercooler heat exchanger is configured to place the fuel and a first working fluid in a thermal communication and wherein the intercooler is configured to receive the first working fluid from the intermediate intercooler heat exchanger and place the first working fluid in thermal communication with the first compressed air flow, such that thermal energy is transferred indirectly from the first compressed air flow to the fuel.

5. The gas turbine engine system of claim 2, wherein the heat exchange system further comprises an exhaust heat exchange system configured to transfer thermal energy from the exhaust gas flow to the fuel, wherein the exhaust heat exchange system is fluidly coupled to one of the heat exchangers selected from the group consisting of the intercooler and the intermediate intercooler heat exchanger.

6. The gas turbine engine system of claim 5, wherein the exhaust heat exchange system comprises an exhaust heat exchanger fluidly coupled to the intercooler.

7. The gas turbine engine system of claim 5, wherein the exhaust heat exchange system comprises:
an exhaust heat exchanger; and
an intermediate exhaust heat exchanger fluidly coupled to the intermediate intercooler and
the exhaust heat exchanger, wherein the intermediate exhaust heat exchanger is configured to place the fuel in thermal communication with a second working fluid, and wherein the exhaust heat exchanger is configured to receive the second working fluid from the intermediate exhaust heat exchanger and place the second working fluid in thermal communication with the exhaust gas, such that thermal energy is transferred indirectly from the exhaust gas to the fuel.

8. The gas turbine engine system of claim 1, wherein the fuel turbine system further comprises a combination motor/generator mechanically coupled to a rotor shaft of the multi-stage fuel turbine and configured to be driven by the multi-stage fuel turbine.

9. The gas turbine engine system of claim 1, wherein the fuel pump is in fluid communication with a cryogenic fuel.

10. A method of operating a gas turbine engine system, the gas turbine engine system comprising a gas turbine engine, the gas turbine engine comprising a compressor section, the compressor section comprising a low pressure compressor and a high pressure compressor, the low pressure compressor configured to compress an inlet air flow to produce a first compressed air flow, the high pressure compressor fluidly coupled to the low pressure compressor and configured to compress the first compressed air flow to produce a second compressed air flow, the gas turbine engine further comprising a combustor fluidly connected to an outlet of the high pressure compressor and configured to combust a mixture of the second compressed air flow and a gaseous fuel, the gaseous fuel being at a first pressure, to produce a combustion gas flow, the gas turbine engine further comprising a turbine fluidly coupled to the combustor and configured to extract energy from expansion of the combustion gas flow to produce an exhaust gas flow, the gas turbine engine further comprising an engine heat exchange system configured to transfer thermal energy from the first compressed air flow and the exhaust gas flow to a fuel to produce the gaseous fuel at a second pressure greater than the first pressure, the gas turbine engine system further comprising a fuel turbine system, the fuel system comprising a multi-stage fuel turbine fluidly coupled to the engine heat exchange system and the combustor and configured to extract energy from expansion of the gaseous fuel at the second pressure, wherein the multi-stage fuel turbine comprises an interstage discharge outlet configured to extract fuel, before a final turbine stage of the multi-stage fuel turbine, at a higher pressure than a fuel pressure at a final outlet of the multi-stage fuel turbine, wherein the fuel turbine system is configured to mix fuel from the interstage discharge outlet and the final outlet to produce the gaseous fuel at the first pressure and supply the gaseous fuel at the first pressure to the combustor, the fuel turbine system further comprising a fuel pump fluidly coupled to the engine heat exchange system and configured to be driven by the multi-stage fuel turbine, the method comprising:
compressing, with the low pressure compressor, the inlet air flow to produce the first compressed air flow;
cooling the first compressed air flow in an intercooler heat exchange system of the engine heat exchange system to produce a cooled compressed air flow, wherein cooling the first compressed air flow comprises transferring thermal energy from the first compressed air flow to a liquid fuel to produce the gaseous fuel;

compressing, with the high pressure compressor, the cooled compressed air flow to produce the second compressed air flow;

extracting energy from expansion of the gaseous fuel through the multi-stage fuel turbine, wherein expansion of the gaseous fuel decreases a pressure of the gaseous fuel to a pressure greater than a pressure of the second compressed air flow;

extracting the gaseous fuel from the interstage discharge outlet upstream of a final turbine stage of the multi-stage fuel turbine;

combusting the mixture of the gaseous fuel, the gaseous fuel being at the first pressure, and the second compressed air flow in the combustor; and pumping the liquid fuel to the intercooler heat exchange system via the pump, the pump being driven by the multi-stage fuel turbine.

11. The method of claim 10, further comprising providing the gaseous fuel from the intercooler heat exchange system to an exhaust heat exchange system of the engine heat exchange system, and transferring thermal energy to the gaseous fuel in the exhaust heat exchange system, wherein the liquid fuel is cryogenic.

12. The method of claim 11, wherein transferring thermal energy to the gaseous fuel comprises transferring thermal energy from an exhaust gas of the gas turbine engine to the gaseous fuel.

13. The method of claim 12, wherein transferring thermal energy from the first compressed air flow to the liquid fuel to produce the gaseous fuel comprises pumping the liquid fuel through an intercooler of the intercooler heat exchange system, wherein the intercooler is disposed in a flow path of the first compressed air flow.

14. The method of claim 12, wherein transferring thermal energy from the first compressed air flow to the liquid fuel to produce the gaseous fuel comprises:

pumping the liquid fuel through an intermediate intercooler heat exchanger of the intercooler heat exchange system;

pumping a first working fluid through an intercooler of the intercooler heat exchange system and the intermediate intercooler heat exchanger;

transferring thermal energy from the first compressed air flow to the first working fluid; and transferring thermal energy from the first working fluid to the liquid fuel to produce the gaseous fuel.

15. The method of claim 14, further comprising:

pumping the gaseous fuel from the intermediate intercooler heat exchanger through an intermediate exhaust heat exchanger of the exhaust heat exchange system;

pumping a second working fluid through each of a first exhaust heat exchanger of the exhaust heat exchange system and the intermediate exhaust heat exchanger;

transferring thermal energy from the exhaust gas to the second working fluid; and transferring thermal energy from the second working fluid to the gaseous fuel received from the intermediate intercooler heat exchanger.

16. The method of claim 10, further comprising extracting power from the multi-stage fuel turbine via a combined motor/generator.

17. A gas turbine engine system comprising:

a gas turbine engine, the gas turbine engine comprising a combustor configured to combust a mixture of air and a gaseous fuel; and a fuel system configured to provide the gaseous fuel to the combustor, the fuel system comprising:

a heat exchange system configured to transfer heat to a liquid fuel to produce the gaseous fuel at a second pressure; and a fuel turbine system, comprising:

a multi-stage fuel turbine in fluid communication with the heat exchange system and configured to extract energy from expansion of the gaseous fuel at the second pressure, wherein the multi-stage fuel turbine comprises an interstage discharge outlet configured to extract fuel, before a final turbine stage of the multi-stage fuel turbine, at a higher pressure than a fuel pressure at a final outlet of the multi-stage fuel turbine; and a fuel pump in fluid communication with the heat exchange system and configured to deliver the liquid fuel to the heat exchange system, wherein the fuel pump is mechanically coupled to the multi-stage fuel turbine and configured to be driven by the multi-stage fuel turbine;

wherein the fuel system is configured to:

mix fuel from the interstage discharge outlet and the final outlet to produce the gaseous fuel at the first pressure and at a first temperature, and provide the gaseous fuel at the first pressure and at the first temperature to the combustor.

18. The gas turbine engine system of claim 17, wherein the heat exchange system comprises an intercooler of a compressor section of the gas turbine engine, the intercooler configured to cool a compressed air flow.

19. The gas turbine engine system of claim 8, wherein the combined motor/generator is configured to drive the fuel pump when the multi-stage turbine is not in operation.

* * * * *